United States Patent
Kelly (12)

(10) Patent No.: US 6,220,569 B1
(45) Date of Patent: Apr. 24, 2001

(54) ELECTRICALLY CONTROLLED PROPORTIONAL VALVE

(75) Inventor: Edmund F. Kelly, Newport Beach, CA (US)

(73) Assignee: Clippard Instrument Laboratory, Inc., Cincinnati, OH (US)

( * ) Notice: Subject to any disclaimer, the term of this patent is extended or adjusted under 35 U.S.C. 154(b) by 0 days.

(21) Appl. No.: 09/478,853

(22) Filed: Jan. 7, 2000

(51) Int. Cl.$^7$ .................................................. F16K 31/02
(52) U.S. Cl. ............................ 251/129.08; 251/129.16
(58) Field of Search ..................... 251/129.08, 129.16, 251/129.15

(56) References Cited

U.S. PATENT DOCUMENTS

| | | |
|---|---|---|
| 3,766,935 | 10/1973 | Clippard, III . |
| 3,786,831 | 1/1974 | Clippard, III . |
| 3,827,672 | 8/1974 | Stampli . |
| 3,921,670 | 11/1975 | Clippard, Jr. et al. . |
| 4,245,815 | 1/1981 | Willis . |
| 4,635,683 | 1/1987 | Nielsen . |
| 4,664,136 | 5/1987 | Everett . |
| 4,954,799 | 9/1990 | Kumar . |
| 5,232,196 | 8/1993 | Hutchings et al. . |
| 5,424,704 | * 6/1995 | Dolle ........................ 251/129.18 X |
| 5,544,674 | 8/1996 | Kelly . |
| 6,079,435 | * 6/2000 | Franz et al. ................ 251/129.08 X |

FOREIGN PATENT DOCUMENTS

| | | | |
|---|---|---|---|
| 2303450 | * | 8/1974 (DE) | ............................. 251/129.16 |

* cited by examiner

Primary Examiner—Kevin Lee
(74) Attorney, Agent, or Firm—Wood, Herron & Evans, L.L.P.

(57) ABSTRACT

An electrically controlled proportional valve provides for precise control of fluid flow using an armature which is positioned at the center of a spider. The armature is supported and biased axially by a plurality of springs that radiate outwardly from it. The springs support the armature for elastic movement in the axial direction, and hold it biased against a first port, so that the armature functions as a valve element, which normally closes that port. A magnet coil is positioned so that when energized it applies force to the armature, overcoming the bias of the springs and drawing the armature away from the first port. During armature movement the plurality of springs are deflected at their outer diameter against an angled surface on the valve case. The increased spring surface area that rests against the valve case causes a proportional relationship between the movement of the armature and the magnetic field created by the magnet coil. A spring-loaded seal in the armature compensates for dimensional instability of the elastomeric seal material and the armature assembly.

13 Claims, 2 Drawing Sheets

ELECTRICALLY CONTROLLED PROPORTIONAL VALVE

FIELD OF THE INVENTION

The present invention relates to a proportional flow valve of the electrically controlled, magnetically operated type.

BACKGROUND OF THE INVENTION

Proportional valves are useful in pneumatic control circuits, and may be used, for example, to control precise gas flow through the valve. An example of such a valve is shown in the U.S. patent to Hutchings, U.S. Pat. No. 5,232,196. Hutchings shows an electrically operated pneumatic valve in which a combination valve member and magnetically operated armature in the form of poppet are biased by a three-lobed flat spring so as to proportionally control flow. Energization of a solenoid, controls or meters the output flow of the valve.

Unfortunately, in the Hutchings valve, the armature consists of a solenoid plunger and a poppet of substantial weight.

SUMMARY OF THE INVENTION

The present invention relates to a proportional valve of this type having a movable valve element which is in the form of a "spider," and which also comprises the armature operated by the electromagnet coil. The spider includes springs which bias the armature-valve element against a port, so that the armature normally closes the port. The use of a spider substantially reduces the armature weight.

It is the objective of this invention to provide a magnetically operated type valve wherein the application of a very small amount of electric power to the magnet coil will create a proportional relationship between the electrical current of the magnet coil to a precise control of valve flow.

A valve in accordance with the invention includes a body structure presenting a first port entering an internal cavity or chamber. Also, communicating with said cavity is a second port. Flow through the first port is controlled by a movable valve element which is a magnetically responsive armature in the form of a "spider." More specifically, the armature is at the center of the spider, and the "legs" and "beams" of the spider comprise a plurality of springs that extend radially or transversely outwardly. At their outer ends, the beams are mounted so that they bias or press against an angled surface of the valve case causing the armature to rest against the first port valve seat, so that that port is normally closed. The spider thus provides support for the armature that obviates the sliding friction or "scrubbing" that accompanies solenoid-type armatures. In the embodiment, during electrical activation of the valve, the armature is used to control flow between the first port and second port that both communicate with the cavity.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
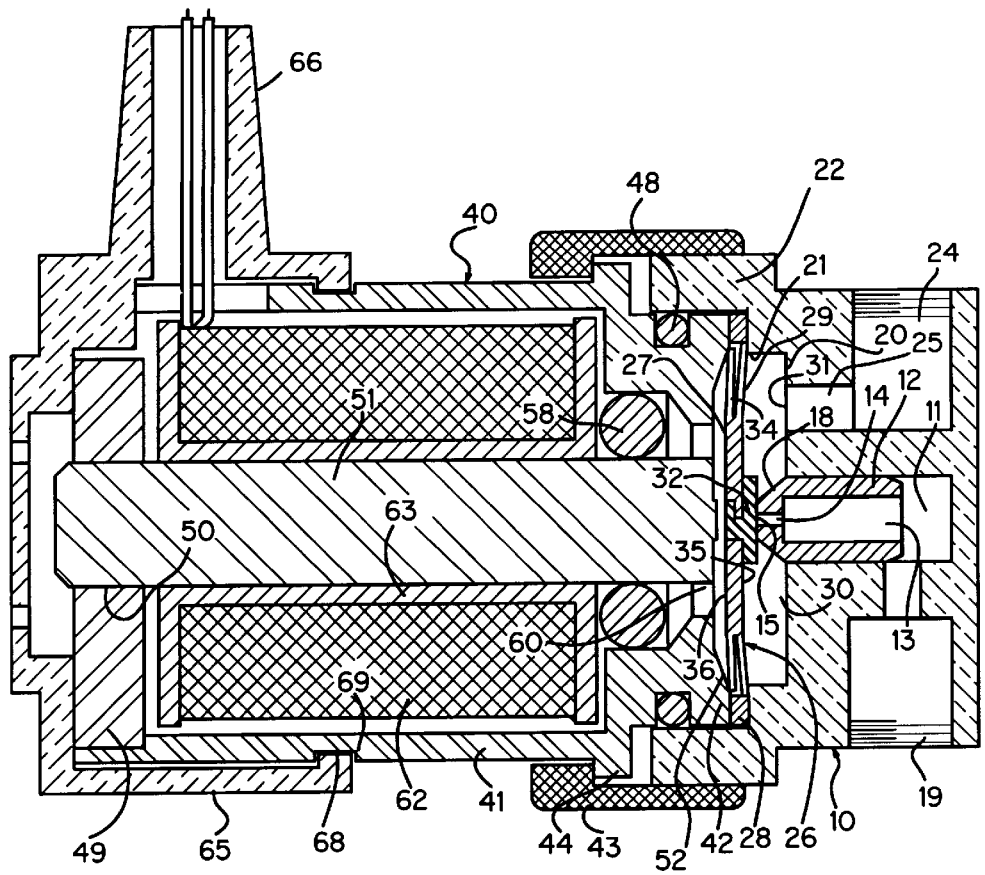
FIG. 1 is an axial section of a preferred form of a valve in accordance with the invention, showing the valve in the normal, magnet de-energized condition.

The valve embodiment illustrated in the drawing includes body structure 10 which is adapted to be received in one end of the internal cavity of the manifold body of valves of the type shown in U.S. Pat. Nos. 3,766,935 and 3,786,831. Body 10 has a stopped central bore 11, in which is secured an insert 12 that presents an axial first passage 13 that leads through a stepped bore 14 to a first port 15. A tip 18 of small area is presented by insert 12 around first port 15, and forms a small seat for a movable valve element to be described. A bore 19 leads radially through body 10 to the inner end of bore 11, and in use a fluid conduit, not shown, may be coupled to this bore 19.

Figure 3:
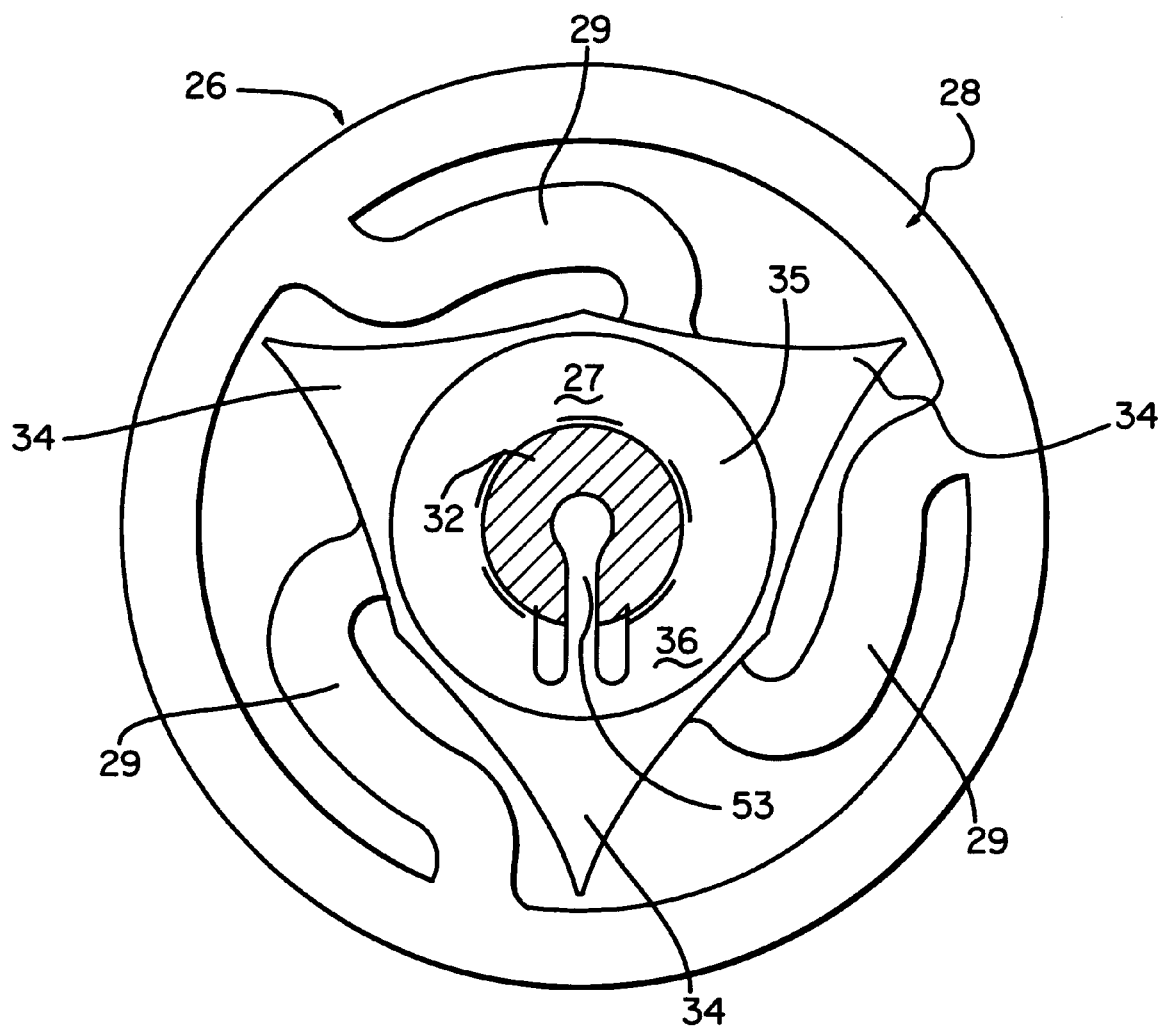
FIG. 3 is an enlarged plan view of the spider-armature of the valve shown in FIGS. 1 and 2.

Body 10 is recessed, as at 20, around the projecting tip 18 of insert 12. An externally threaded skirt 22 surrounds recess 20, thereby defining an internal cavity or valve chamber 30. An internal shoulder or ledge 21 is formed around skirt 22, and this shoulder is spaced axially from the recess 20. An element 26, referred to herein as a "spider," is seated on shoulder 21. The spider is yieldable in the axial direction, as a spring. In preferred embodiment, as best shown in FIG. 3, spider 26 is an assembly which includes a unitary central portion or armature 27 and a peripheral or mounting portion 28, these portions being connected by arcuate spiderlike arms 29 which act as springs and support arms between the portions 27 and 28. Additionally, spring beams 34 are axially deflected against case 40 (not shown in FIG. 3) for added spring force during armature movement.

At its center the armature 27 carries an elastomeric port sealing member 32 which is attached to armature 27 in a spring-loaded manner. The member 32 can be attached to the armature in various manners. FIG. 3 shows one embodiment, in which member 32 is mounted in a spring loaded manner by the use of the elastomeric member leaf spring 53 shown in FIG. 3. The leaf spring 53 is an integral part of the spider 26. Spring loading the elastomeric seal compensates for any dimensional instability of the elastomer material due to swelling or shrinkage. The armature has an internal through hole which allows the spring loaded elastomeric port seal 32 to engage with first port 15. As can be seen in FIG. 1, the elastomeric member 32 projects slightly in the axial direction from the face or surface 35 of the armature which faces the first port 15.

Both the spring arms 29 and spring beams 34 of the spider are preferably of reduced thickness, as compared to the outer edge portion 28 and the armature or center portion 27, to reduce their mass and to reduce the spring rate when the armature is displaced axially relative to the edge. The spider is formed of a magnetically responsive but not permanently magnetizable (i.e., ferromagnetic) material which is also springlike. Such materials are commercially available. The portions having reduced thickness can be formed by electrochemical milling.

The peripheral portion 28 of the spider is clamped on shoulder 21 of body 10 in a plane forward, i.e., to the right in FIG. 1, of the position at which the elastomeric member 32 comes to bear against port 15. In this position, stress is imparted to both spring arms 29 and spring beams 34 of the spider, which urges the center portion or armature, including the elastomeric member therein, to the right and against the first port, so that normally (i.e., when the coil to be described is not energized), the armature closes and seals port 15 and a force of certain magnitude is required to draw the armature away from that port and open that port to chamber 30. Passages 24 and 25 lead through body 10 to a second port 31 which also opens to chamber 30.

The spider is clamped on shoulder 21 by a coil carrying case designated generally at 40. Case 40 includes a ferromagnetic or a magnetically responsive outer shell or cylinder 41 which has a centrally extending rim or flange 42 at one end thereof, i.e., the right end in FIG. 1, and which bears against the peripheral portion 28 of the spider. Radially inward from flange 42 on case 40 is a case ramp 52 which acts as a rigid support for the spring beams 34 that are an integral part of the spider. An internally threaded screw collar 43 is carried on a retaining rib 44 around shell 41, and this collar 43 is knurled so that it can be threaded onto the external threads on body skirt 22, thereby to hold the body and case together with the spider rim 28 clamped between them. An O-ring 48 is carried in a peripheral groove around flange 42, and forms a seal with the inside surface of body skirt 22 to prevent loss of fluid pressure in operation.

At its outer or left end in FIG. 1, shell 41 is provided with an end plate 49 which has a bore 50. In this axial bore 50 is secured a central core, also ferromagnetic, designated at 51. An O-ring 58 provides a fluid seal between core 51 and the outer shell.

An electric coil 62, wound on a spool or bobbin 63, is mounted on core 51 within shell 41 between end cap 49 and flange 42. It will be noted that an air gap 60, in the magnetic path of coil 62, is presented between 51 and the radially inner edge of flange 42. It should also be noted that the diameter of armature 27 is greater than that of this air gap 60, so that the armature overhangs flange 42. A snap-on cap 65 covers and encloses the end of the coil assembly, and includes an access opening or bracket 66 for the electrical leads to coil 62. Cap 65 has an inwardly facing rib or detent 68 which is cooperable with an external groove 69 on shell 41 to form a snap connection for holding the cap on the shell.

In one mode of use, a source of pressure air is connected to passage 19 and the first port 15 is thus a pressure port which is normally closed. Passage 24 is connected to an object upon which work is to be done (e.g., a cylinder, or to the spool of a second stage valve), and port 31 thus is a control port.

Figure 2:
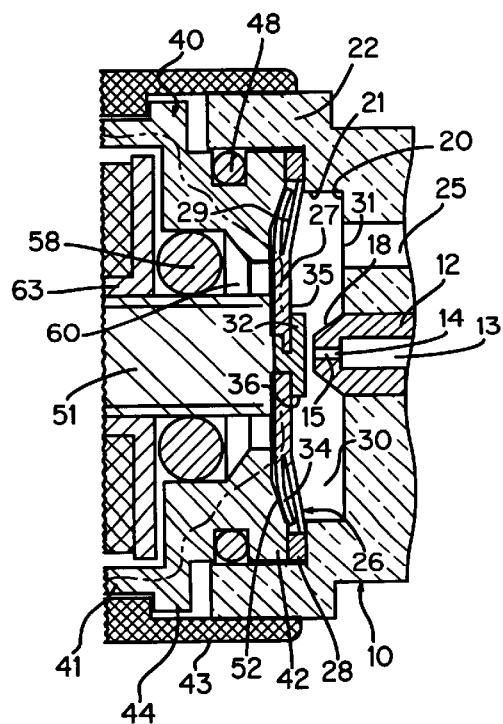
FIG. 2 is a fragmentary view similar to FIG. 1 but showing the valve in the energized condition.

When magnet coil 62 is energized a magnetic field is set up around it in the circuit including core 51, end plate 49, shell 41, flange 42, across air gap 60 via the armature 27 of spider 26, and core 51. The magnetic circuit is shown by the dashed lines in FIG. 2; the magnetic circuit extends via flange 42, the center portion of the spider, and the core. Air gap 60 causes magnetic flux density to be elevated in air gap 60, so that the armature 27 in the center portion of the spider is magnetically drawn toward the second port, i.e., to the left as shown in FIG. 2.

The magnitude of the magnetic force exerted on the armature, in comparison to the opposing spring force exerted by both spring arms 29 and spring beams 34, is sufficient to overcome the spring bias, and the armature 27 of the spider is drawn away from first (or pressure) port 15. As this occurs, fluid communication is established between pressure port 15 and the second (or control) port 31. As the armature 27 is drawn away from the first port 15 the surface contact of the spring beams 34 with the case ramp 52 increases radially inward. This increase in surface contact is proportional to the magnetic force exerted on the armature.

The relationship between "point of contact" of the force exerted on the spring beams 34 and the deflection of the beams is shown in the derivation shown in Appendix A. A derivation was performed to a double integration equation because no relationship could be found in any related published material.

The relationship derived in Appendix A between load (P) and deflection (y), where x is greater than z, creates a proportional relationship of armature movement to magnetic force. This in turn creates an approximately proportional relationship between armature movement away from first port 15, and therefore fluid flow through first port 15, to electrical current through said magnet coil. Thus, the illustrated valve provides a means of controlling valve flow in a manner that is approximately proportional to electrical current through said magnet coil.

By way of example, where the invention is embodied in such a miniature pneumatic control valve, the range of armature movement is about 0.010 inch, although this will of course vary with and depend upon pressure, bore sizes and the like. Inlet pressures up to about 150 psi can be controlled at a very fractional wattage power consumption, by reason of the low mass, low friction armature and its mounting. The spider configuration provides very uniform operation in that it holds the shiftable armature center portion precisely perpendicular to the axes of the ports. Thus, a relatively large inlet pressure can be utilized to control port 31, with a very small power input.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An electrically controlled flow valve comprising:
    a valve body defining a cavity having an interior surface and including first and second ports extending exterior of said valve body, and a valve seat between said first and second ports;
    a magnet coil within said valve body;
    a valve core within said coil fixed to said valve body for channeling magnetic field through said coil;
    a spider positioned within said cavity, said spider carrying an armature positioned in opposition to said valve seat, said spider affixed at an outer edge thereof to said valve body, said spider comprising one or more deflectable spring arms extending between said outer edge and said armature, said spider further comprising one or more spring beams extending from said spider and engaging a contact point of interior surface of said cavity, said spring arms and spring beams permitting axial movement of said armature assembly within said cavity for movement toward and away from said valve seat for blocking and unblocking said first port;
    wherein current through said coil generates magnetic force to move said armature relative to said first port and valve core.

2. The valve of claim 1 wherein movement of said armature relative to said first port and valve core is in proportion to flow of current through said magnet coil.

3. The valve of claim 1, wherein a contact point of said spring beams with said interior surface of said cavity changes with movement of said armature.

4. The valve of claim 3 wherein alteration of a contact point of said spring beams creates a spring force upon said armature that is proportional to armature deflection from a home position.

5. The valve of claim 3 wherein said contact point of said spring beams moves radially relative to said armature with movement of said armature.

6. The valve of claim 1 wherein said armature comprises an elastomer material for forming a seal with said valve seat.

7. The valve of claim 6, wherein said spider further comprises an elastomeric member leaf spring, said armature being mounted to said leaf spring whereby to compensate for elastomer material variations due to swelling or shrinkage.

8. An electrically controlled flow valve comprising:

a valve body defining a cavity having an interior surface and including first and second ports extending exterior of said valve body, and a valve seat between said first and second ports;

a magnet coil within said valve body;

a valve core within said coil fixed to said valve body for channeling magnetic field through said coil;

a spider positioned within said cavity, said spider carrying an armature positioned in opposition to said valve seat, said spider comprising one or more spring beams extending from said spider and engaging a contact point of interior surface of said cavity, said beams permitting axial movement of said armature assembly within said cavity for movement toward and away from said valve seat for blocking and unblocking said first port, wherein a contact point of said spring beams with said interior surface of said cavity changes with movement of said armature;

wherein current through said coil generates magnetic force to move said armature relative to said first port and valve core.

9. The valve of claim 8 wherein said spider is affixed at an outer edge thereof to said valve body, said spider comprising one or more deflectable spring arms extending between said outer edge and said armature.

10. The valve of claim 8 wherein alteration of a contact point of said spring beams creates a spring force upon said armature that is proportional to armature deflection from a home position.

11. The valve of claim 10 wherein said contact point of said spring beams moves radially relative to said armature with movement of said armature.

12. The valve of claim 8 wherein said armature comprises an elastomer material for forming a seal with said valve seat.

13. The valve of claim 12, wherein said spider further comprises an elastomeric member leaf spring, said armature being mounted to said leaf spring whereby to compensate for elastomer material variations due to swelling or shrinkage.

* * * * *

UNITED STATES PATENT AND TRADEMARK OFFICE
CERTIFICATE OF CORRECTION

PATENT NO.    : 6,220,569 B1
DATED         : April 24, 2001
INVENTOR(S)   : Edmund F. Kelly It is certified that error appears in the above-identified patent and that said Letters Patent is hereby corrected as shown below:

Appendix A is attached after Column 6.

Signed and Sealed this

Fifth Day of March, 2002

*Attest:*

*Attesting Officer*

JAMES E. ROGAN
*Director of the United States Patent and Trademark Office*

APPENDIX A

Derivation of Non-Uniform Beam Deflection $$EI \frac{d^2y}{dx^2} = \text{Moment}$$

$$EI \frac{d^2y}{dx^2} = -P(x-z)$$

$$I = \frac{1}{12}(\text{base})h^3$$

$$I = \frac{1}{12}(2y)h^3$$

$$I = \frac{1}{12}(2Cx^n)h^3$$

$$E \frac{1}{12} 2Cx^n h^3 \frac{d^2y}{dx^2} = -Px + Pz$$

$$\frac{d^2y}{dx^2} = \frac{12}{2EC\,h^3}\left[\frac{-Px}{x^n} + \frac{Pz}{x^n}\right]$$

$$\frac{d^2y}{dx^2} = \frac{6}{EC\,h^3}\left[Pz\,x^{-n} - Px^{1-n}\right]$$

where:

- $E$ = Modulus of Elasticity
- $P$ = Load
- $I$ = Moment of Inertia
- $h$ = thickness of beam
- $C$ = Constant
- $z$ = Distance of load from end of beam

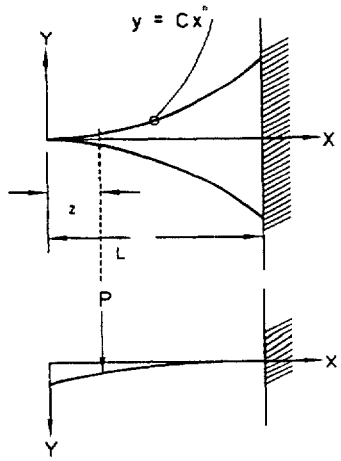

$$\frac{d^2y}{dx^2} = \frac{6}{EC\,h^3}\left[Pz\,x^{-n} - Px^{1-n}\right]$$

Integrating yields $$\frac{dy}{dx} = \frac{6}{EC\,h^3}\left[\frac{Pz\,x^{(-n+1)}}{(-n+1)} - \frac{Px^{(-n+2)}}{(-n+2)}\right] + C_1$$

Conditions: $dy/dx = 0$ and $x = L$ $$0 = \frac{6}{EC\,h^3}\left[\frac{Pz\,L^{(-n+1)}}{(-n+1)} - \frac{PL^{(-n+2)}}{(-n+2)}\right] + C_1$$

$$C_1 = -\frac{6}{EC\,h^3}\frac{Pz\,L^{(-n+1)}}{(-n+1)} + \frac{6}{EC\,h^3}\frac{PL^{(-n+2)}}{(-n+2)}$$

Therefore when $C_1$ is substituted $dy/dx$ equals $$\frac{dy}{dx} = \frac{6P}{EC\,h^3}\left[\frac{z\,x^{(-n+1)}}{(-n+1)} - \frac{x^{(-n+2)}}{(-n+2)} - \frac{z\,L^{(-n+1)}}{(-n+1)} + \frac{L^{(-n+2)}}{(-n+2)}\right]$$

Integrating again yields:

$$y = \frac{6P}{EC\,h^3}\left[\frac{z\,x^{(-n+2)}}{(-n+2)(-n+1)} - \frac{x^{(-n+3)}}{(-n+3)(-n+2)} - \frac{z\,L^{(-n+1)}}{(-n+1)}x + \frac{L^{(-n+2)}}{(-n+2)}x\right] + C_2$$

Conditions: $y = 0$ and $x = L$ $$0 = \frac{6P}{EC\,h^3}\left[\frac{z\,L^{(-n+2)}}{(-n+2)(-n+1)} - \frac{L^{(-n+3)}}{(-n+3)(-n+2)} - \frac{z\,L^{(-n+2)}}{(-n+1)} + \frac{L^{(-n+2)}}{(-n+2)}L\right] + C_2$$

Solving for $C_2$ $$C_2 = \frac{6P}{EC\,h^3}\left[-\frac{z\,L^{(-n+2)}}{(-n+2)(-n+1)} + \frac{L^{(-n+3)}}{(-n+3)(-n+2)} + \frac{z\,L^{(-n+2)}}{(-n+1)} - \frac{L^{(-n+3)}}{(-n+2)}\right]$$

Finally deriving the deflection equation:

$$y = \frac{6P}{EC\,h^3}\left[\frac{z\,x^{(-n+2)} - z\,L^{(-n+2)}}{(-n+2)(-n+1)} + \frac{L^{(-n+3)} - x^{(-n+3)}}{(-n+3)(-n+2)} + \frac{z\,L^{(-n+2)} - z\,L^{(-n+1)}x}{(-n+1)} + \frac{L^{(-n+2)}x - L^{(-n+3)}}{(-n+2)}\right] -$$